United States Patent
Kaufman et al.

[15] 3,667,286
[45] June 6, 1972

[54] VISCOMETER

[72] Inventors: William M. Kaufman, Chevy Chase; Harry P. Kling, Glenarm, both of Md.

[73] Assignee: Hittman Associates, Inc., Columbia, Md.

[22] Filed: Apr. 21, 1970

[21] Appl. No.: 30,566

[52] U.S. Cl. ..................................................73/59
[51] Int. Cl. .........................................G01n 11/10
[58] Field of Search ..............................73/59, 60

[56] References Cited

UNITED STATES PATENTS

| | | | |
|---|---|---|---|
| 2,280,947 | 4/1942 | Gulliksen | 73/59 |
| 2,630,707 | 3/1953 | Tyler | 73/59 |
| 3,079,787 | 3/1963 | Van Luik, Jr. | 73/59 |
| 3,545,257 | 12/1970 | Zemp et al. | 73/59 |

FOREIGN PATENTS OR APPLICATIONS

| | | | |
|---|---|---|---|
| 926,094 | 4/1955 | Germany | 73/60 |

Primary Examiner—Louis R. Prince
Assistant Examiner—Joseph W. Roskos
Attorney—Fleit, Gipple & Jacobson

[57] ABSTRACT

A viscometer, particularly suited for blood viscometry. The inventive viscometer is circularly symmetrical and comprises a cylindrical channel for housing an unknown fluid and a ring-shaped channel, concentric with the cylindrical channel, for housing a known Newtonian fluid. A floatable cover element is provided with a cylindrical projection adapted to associate with the cylindrical channel and the fluid housed therein, and is further provided with a ring-shaped projection adapted to associate with the ring-shaped channel and the Newtonian fluid housed therein. The cover element floats in the known Newtonian fluid with a fluid bearing action, the ring-shaped projection being coated with a material which is non-wettable, and the channel being coated with a material wettable by the known fluid. The block in which is defined the cylindrical channel and the block in which is defined the ring-shaped channel are rotated in opposite directions, and the relative velocity of rotation therebetween is adjusted until the floating cover element is stationary. The relative rotation between the cylindrical channel block and the ring-shaped channel block is proportional to the viscosity of the unknown sample.

12 Claims, 1 Drawing Figure

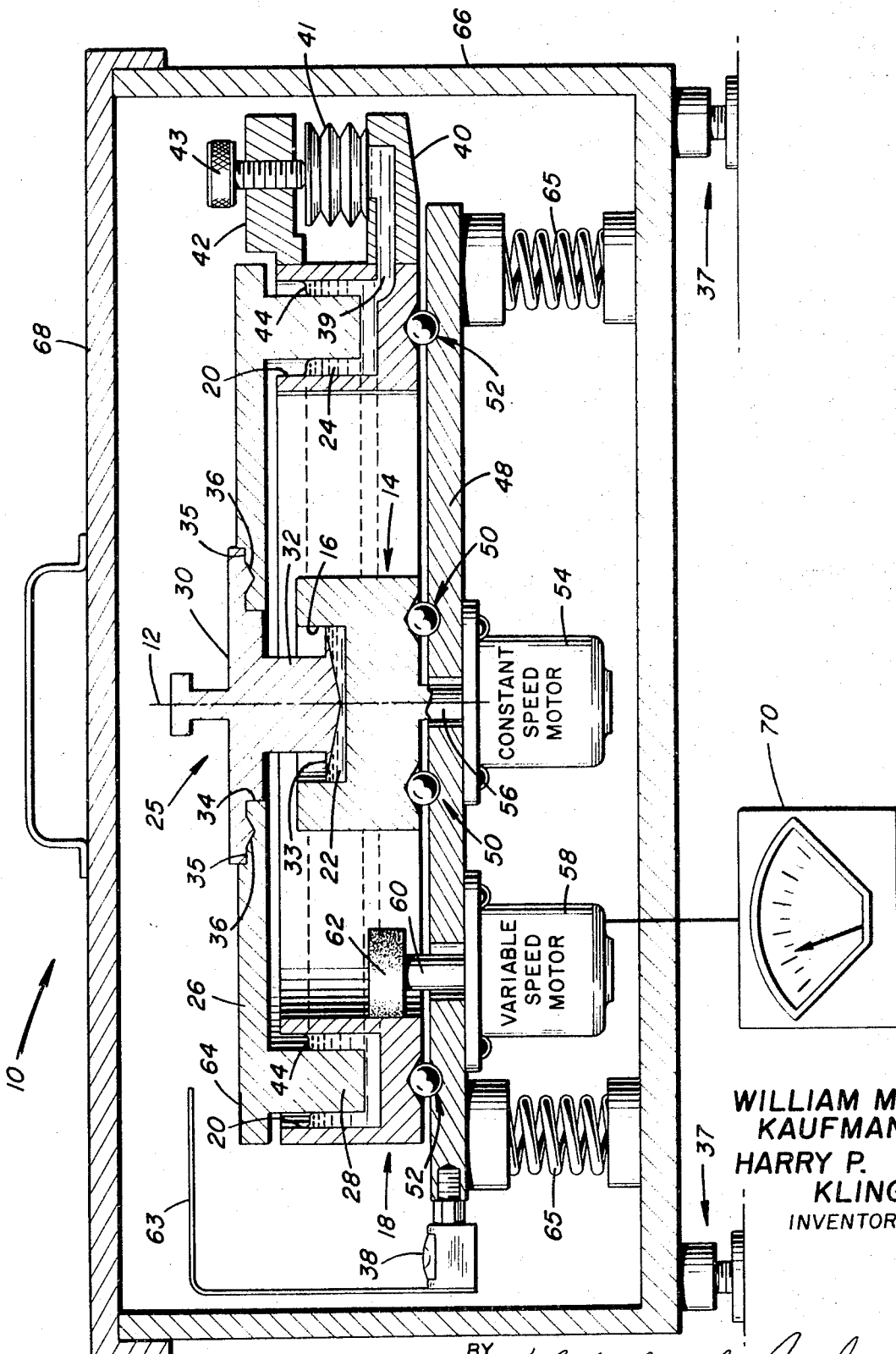

VISCOMETER

BACKGROUND OF THE INVENTION

There are many viscometers known to the prior art. However, each of these known viscometers suffers from at least one of a large number of drawbacks. For example, some viscometers, such as the Ostwald viscometer, do not apply a uniform rate of shear to the sample and are not very useful at low shear rates. Other commercially available viscometers are either not sufficiently sensitive or are extremely delicate and expensive.

Particularly in the field of blood viscometry, it is important that the viscometer function with a small fluid sample—the patients in need of blood viscometry work often have already suffered a considerable loss of blood. A major drawback of several known viscometers is that a large blood sample is required for an accurate determination of viscosity.

Another typical disadvantage which plagues the field of viscometry is that many of the known viscometers are so complex that skilled technicians are needed for their operation and for an accurate evaluation of their results.

A further disadvantage associated with most known viscometers is that solid bearing surfaces are required between the moving parts and the fluid or fluids. These bearing surfaces become worn, and because the viscometers deal with precise measurements at low shear rates, the worn bearing surfaces may introduce large errors in the viscosity measurements.

It is toward the elimination of the above-mentioned drawbacks in the art of viscometry that the present invention is directed.

SUMMARY OF THE INVENTION

The present invention relates to a viscometer, particularly suited to blood viscometry, which is relatively free from the disadvantages plaguing the viscometers of the prior art. The inventive viscometer is capable of yielding viscosity measurements with small fluid samples, on the order of 1 to 2 milliliters, and within approximately 1 minute; it may be operated by personnel with limited scientific training; it is simple in construction and is yet rugged; it is inexpensive to manufacture, and yet maintains accurate readings at low shear rates; and it may be quickly and easily cleaned and readied for subsequent operations.

A major advantage of the inventive viscometer, responsible for many of the desirable features noted above, is that contiguous solid bearing surfaces between the driven members and the torque sensing member of the present viscometer are totally absent. In this manner, one very critical source of static frictional forces is substantially eliminated. More particularly, rather than applying solid bearing surfaces between the driven members and the torque sensing member, the inventive viscometer makes use of fluid bearings.

It is true that solid bearing surfaces are present in the viscometer of the present invention. However, these bearing surfaces are directly coupled to motors which can be given enough torque to overcome the static frictional forces. It is between the driven members and the sensing member that the static frictional forces are most critical; and here, no solid bearing surfaces are present.

In construction, the viscometer of the present invention is extremely simple. It comprises, basically, three circularly concentric elements—one passive element and a pair of driven elements. If desired, the number of passive elements may be increased to two, thus simplifying the charging and cleansing operations. A readout mechanism is also provided.

The three basic elements of the inventive viscometer are rotatable relative to one another. These elements are interconnected by means of a Newtonian fluid having known properties, and an unknown sample of fluid. One of the three movable elements, housing the unknown fluid sample, is rotated at a fixed rate of rotation and in a first sense. Another of the rotatable elements, housing the known fluid, is rotated in a second and opposite sense and at a variable speed which is adjusted so that the third element comes to a standstill. The viscosity of the unknown fluid is proportional to the speed of rotation of the second rotatable element which is necessary to bring the third element to a standstill.

Accordingly, it is the main object of the present invention to provide a viscometer, particularly suitable for blood viscometry, which is simple in design, inexpensive to manufacture, which may be used by unskilled technicians and which accurately provides viscosity measurements at low shear rates.

Another object of the present invention is to provide a viscometer which is capable of yielding viscosity measurements without requiring large fluid samples.

An additional object of the present invention is to provide a viscometer which is rugged and which can, therefore, withstand rough handling during shipment, relocation and continued use.

It is yet a further object of the invention to provide a novel viscometer having no contiguous solid bearing surfaces between driven elements and the passive torque sensing element, thereby eliminating a critical source of difficulties, particularly at low shear rates, arising from static frictional forces.

These and other objects of the invention, as well as many of the attendant advantages thereof, will become more readily apparent when reference is made to the following description taken in conjunction with the accompanying drawing.

BRIEF DESCRIPTION OF THE DRAWING

The sole FIGURE is a cross-section through the viscometer of the present invention.

DETAILED DESCRIPTION OF THE DRAWING

With reference to the FIGURE, the construction of the novel viscometer will be described. The viscometer is shown generally at 10, is circularly symmetrical about centerline 12 and comprises, basically, three parts. A driven cylindrical block 14 is centered at the centerline 12 and has provided therein a shallow bore 16 at the uppermost region thereof. Concentric with the cylindrical block 14 is a ring-shaped driven block 18 having therein a ring-shaped trough 20. The bore 16 defines a chamber which is adapted to house an unknown fluid sample 22 of relatively high viscosity; and the trough 20 defines a chamber which is adapted to house a known Newtonian fluid 24 of relatively low viscosity. If the unknown fluid is of a relatively low viscosity compared to the known Newtonian fluid, it is contemplated, but not essential, that the unknown be housed in the trough 20 while the known Newtonian fluid would be housed in the chamber defined by the bore 16.

A passive torque sensing cover plate, indicated generally at 25, is coextensive with block 14 and block 18, and is shown to include a first disc-like member 26 having a ring-shaped protrusion 28 integral therewith and a second disc-like member 30 having a cylindrical protrusion 32 integral therewith.

As seen from the FIGURE, the ring-shaped protrusion 28 is shaped and dimensioned so as to comfortably fit within the chamber 20, and so that it may float in the known Newtonian fluid 24. Similarly, the cylindrical protrusion 32 is shaped and dimensioned so that when the cover plate 25 floats in the known fluid 24, the surface of the cylindrical protrusion 32 smoothly rides in the unknown fluid 22. It should be noted that the cylindrical protrusion 32 is shaped, at its lowermost region 33, as a cone. Also, it should be noted that the surface of the known fluid 22 is at the same level as the widest portion of the conical region 33. In this manner, the maximum efficiency of the device is realized. As an alternative configuration, the base of the chamber 16 could be made conically convex while the bottom of protrusion 32 could be made planar.

When the viscometer 10 operates, the cover plate 25 floats, through the action of the ring-shaped projection 28, in the Newtonian fluid 24. The "bearing" between the protrusion 28 and the block 18 is thus a pure fluid bearing. This fluid bearing functions in a unique and very important manner. The surface of the protrusion 28 is coated with a material non-wettable by the known Newtonian fluid 24. For example, if the Newtonian fluid is water, the protrusion 28 could be coated with a wax. The surface of the inner surface of channel 20 is coated with a material wettable by the known fluid. For example, with the known fluid being water, the inner surface of channel 20 could be coated with a glass. By so coating protrusion 28 and the inner surface of channel 20, surface tension forces will be set up which cause the floating part to be maintained out of contact with all adjacent solid surfaces. This ensures a fluid bearing even at zero relative motion and thereby ensures reduced "stiction," i.e., cover plate 25 is able to rotate without having to overcome a high level of torque.

To facilitate the changing of the unknown fluid sample 22 and the cleansing of the chamber 16, the cover plate 25 is divided into first and second disc-like members 26 and 30, respectively. The disc-like member 26 has, therethrough, a centrally located bore 34, which bore is adapted to support the disc-like member 30. For this reason, the uniting surface 35, between the members 26 and 30, is stepped.

As is explained below, when the viscometer 10 operates, integrity must be maintained between the respective disc-like members 26 and 30. Therefore, member 30 is provided with a plurality of projections 36 adapted to mate with corresponding indentations in the member 26. Thus, relative movement between members 26 and 30 is prevented.

The cover plate 25, as explained above, is divided into the separate members 26 and 30, respectively, only for reasons of convenience. When it is desired to change the unknown sample 22 housed in the cylindrical chamber 16, the disc-like member 30 is lifted away from the disc-like member 26, ready access then being provided to the chamber 16. When the chamber 16 is cleansed and a new sample is inserted, the member 30 is replaced. Of course, if this convenience is not desired, members 26 and 30 may be made integral.

In preparing the viscometer of the present invention for a viscosity reading, the procedure is as follows. First, a fixed quantity of unknown fluid is introduced into the cylindrical bore 16. The fixed quantity is measured to moderate accuracy by, for example, a pipette. At this time, the known Newtonian fluid 24 is housed in the ring-shaped trough 20. Then, the disc-like member 30 is positioned in its housing provided in the disc-like member 26. It is suggested at this time that the leveling of the viscometer 25 be checked.

To ensure that the base 48 of the viscometer assembly is level, adjusting screws 37 are provided. While any number of adjustment screws 37 may be fitted to the case 66 of the viscometer, three adjusting screws are suggested. A bubble chamber 38, for example, may be positioned on the base 48, thereby serving as a check to ensure that the base is properly leveled.

Once the leveling of the viscometer assembly 25 is completed, the next step is to adjust, with accuracy, the level at which the projection 32 rides in the unknown fluid sample 22. It is desirable that the projection 32 ride so that the apex of the conical region 33 is near, but yet is not touching the base of the chamber 16.

The level of the member 32 is adjusted by acting on the height of the known fluid housed in the ring-shaped trough 20. For this purpose, an opening is fitted in the block 18 and is indicated at 39. A support member 40 is appended to the block 18 and associates with the opening 39 and with a bellows chamber 41 serving as a reservoir for the known fluid. A second support block 42 is associated with the block 18 and supports an adjustment screw 43. By acting on this adjustment screw, the known fluid is pumped either into or out of the cylindrical bore 16 through the action of the bellows chamber 41.

As seen in the FIGURE, the known fluid 24 wettably contacts the inner surface of the trough 20 and non-wettably contacts the surface of the ring-shaped projection 28. It has been found that by so controlling the wetting characteristics of these surfaces, surface tension forces are most advantageously used and efficiently maintain the protrusion 28 out of contact with the trough 20 and thereby maintain the cylindrical projection 32 out of contact with the bore 16. In this manner, and as noted above, one critical source of static friction is eliminated, thus ensuring accurate measurements at low shear rates.

With reference again to the FIGURE, the rotatable relationship between the blocks 14 and 18 and the cover plate 25 will be explained. The cylindrical block 14 is rotatably mounted on a base 48 by means of a ball bearing assembly 50; and the ring-shaped block 18 is mounted on the base 48 by means of a ball bearing assembly 52.

A motor 54 of constant speed is supported on the base and is associated with the cylindrical block 14 through a drive shaft 56, this motor being adapted to rotate in a first sense, for example, clockwise. A second motor 58, of variable speed, is also mounted on the base 48 and serves to drive the block 18. On the output shaft 60 of the variable speed motor 58 is a vertically mounted disc 62, as of rubber, which disc bears against the inner surface of the ring-shaped block 18. Thus, when the motor 58 is operative, block 18 rotates. The motor 58 is adapted to rotate block 18 in a sense opposite from the sense of rotation of the block 14 which is rotated by the motor 54; in this example, the variable speed motor 58 is adapted to rotate the block 18 in a counterclockwise sense.

The variable speed motor 58 is provided to allow the relative speeds between the two moving fluid chambers to be adjusted so that the floating member is absolutely still. The result of such adjustment is that the viscosity of the unknown fluid may be readily determined. When the floating member is stationary, the viscosity of the unknown fluid is directly proportional to the speed of the block 18 and thus the variable speed of motor 58.

As noted in the preceding paragraph, the speed of the block 18 is proportional to the viscosity of the unknown fluid 22 only when the floating member is absolutely stationary. It is therefore of utmost importance that means be provided to ensure that there is no relative motion between the base 48 and the floating member 25. In the drawing, the means used for ensuring that the disc-like member 26 is stationary with respect to the base 48 takes the form of a wire, or hairline 63 rigidly attached to the base 48 and a grid-like arrangement carved directly onto the disc-like member 26, the grid arrangement being shown at 64. Alternatively, other well-known techniques of motion sensing may be employed, such as interferometry, capacitance sensing or inductance sensing, naming just a few examples.

Associated with the variable speed motor 58 is a meter 70, which may be, for example, a tachometer. As noted previously, and as will be more fully explained below, the viscometer 10 of the present invention depends upon the principle that the speed of the block 18 is proportional to the viscosity of the unknown fluid 22 when the floating member is stationary. Therefore, by fitting the variable speed motor 58 with a meter 70 capable of reading the motor speed, and thus the rotational speed of block 18, the viscosity of the fluid 22 may readily be determined. In fact, the meter 70 may be calibrated in such a manner that its reading is a direct indication of the viscosity of the unknown fluid. Alternatively, since the speed of the motor 58 is an indication of the viscosity of the fluid 22, the position of the speed control knob associated with this motor may be used to give a direct reading of viscosity. That is, the speed control knob of the motor 58 may be calibrated in terms of viscosity.

As shown in the FIGURE, the operating elements of the viscometer 10 may be shock mounted, as by means of springs 65, and may be housed in an enclosure defined by a base 66 and a removable and transparent cover 68. To best make use of the shock-absorbing springs, the total sprung mass of the device and the spring constants of the springs 65 are chosen so as to constitute an efficient vibration damper for the random ambient vibrations likely to be found in the average clinical laboratory. In this manner, the ruggedness and the accuracy of the inventive viscometer are greatly enhanced. And, by enclosing the viscometer in a sealed case, the viscosity readings may be taken without the effects of the external environment. Further, to ensure accurate functioning of the viscometer, notwithstanding changes in environmental temperatures, it is contemplated that the internal temperature of the case be monitored and controlled in such a manner that the viscometer 25 experiences a constant temperature under all ambient conditions.

The operation of the viscometer forming a part of the present invention is as follows. The cover 68 is removed and the disc-like member 30 is lifted from its seat in the disc-like member 26. A small charge of an unknown fluid, 1 to 2 milliliters, is placed in the cylindrical chamber 16. Then, the member 30 is replaced so that the projections 36 associate with the corresponding depressions in the member 26. The liquid level in the ring-shaped trough 20 is then altered, if necessary, by means of the bellows chamber 41 and the adjustment screw 43, so that the cover plate 25 freely floats in the known Newtonian fluid 24 and so that the cylindrical projection 32 extends into the unknown fluid 22 without bearing on the bottom surface of the chamber 16. As noted above, the ring-shaped projection 28 is coated with a material non-wettable by the known fluid 24 and the surface of the channel 20 is coated with a material wettable by the known fluid. In this manner, and due to the effects of surface tension forces, the cover plate 25 is maintained substantially centered with respect to the center line 12.

With the cover 68 over the base 66, the constant speed motor is started and is made to rotate at a speed of, for example, 0.10 rpm. This low speed ensures that inertial effects during the start-up time are negligible. Then, the variable speed motor 58 is activated and is adjusted so that the cover plate 25 is precisely stationary.

Since the relative speed between the chambers 16 and 20 is a direct indication of the viscosity of the unknown fluid 22, and since the motor 54 is of constant speed, the speed of motor 58 could be made to yield direct indications of viscosity. As explained above, this may be done with the meter 70, calibrated to fluid viscosity or, alternatively, with the reading on the control knob of the motor 58. This meter reading, in accordance with the present invention, must be taken at a time when it has been determined that the cover plate 25 is motionless.

The entire operation described above may be carried out in a matter of seconds. This is particularly important since, when dealing with blood viscosity, the operator is allowed a maximum of approximately 60 seconds between withdrawing a fresh blood sample and completing the viscosity measurement. The problem of coagulation may become significant with delays longer than 60 seconds.

As the motors 54 and 58 rotate the blocks 14 and 18 in opposite directions, counteracting forces are applied to the cover plate 25 in the form of shear forces in the two respective fluids 22 and 24. If the torque-versus-speed relationship between the ring-shaped block 18 and the disc-like member 26, associated with one another through the action of the known Newtonian fluid 22, is known, and if the relationship between the shear stress and rotation rate in the structure defined by the cylindrical block 14 and the cylindrical protrusion 32 is known from previous calibrations, then a measurement of rotation rate in the ring-like block 18 is a direct measurement of viscosity of the unknown sample of fluid at the selected rate of shear.

As noted previously, the only connection between the cover plate 25 and the ring-shaped block 18 is in the form of a fluid bearing. This is of particular advantage especially in blood viscometry. In this technology, extremely low rotational velocities and extremely low torques are involved. With mechanical bearings, erratic frictional forces are introduced, and hence, inaccuracies are introduced. Further, since the viscosity of the unknown fluid is determined by the condition that the cover plate 25 is absolutely motionless, mechanical bearings would tend to introduce harmful inaccuracies related to inertial forces. With pure fluid bearings, on the other hand, these drawbacks are eliminated. With pure fluid bearings, the frictional forces are constant. Further, the inertial forces which must be overcome in introducing relative motion between two bodies contacted only by a fluid bearing, are relatively small. Thus, with the present invention, extremely accurate viscosity readings may be taken of an unknown fluid, even when low shear rates are encountered.

Above, there has been described a particular embodiment of the present invention. It should be understood, however, that this embodiment has been described for purposes of illustration only. For example, the cone-plate structure of the chamber housing the unknown fluid may take many other forms. Numerous drive mechanisms other than that described herein may be employed. And, if desired, adjustment means may be provided on the drive mechanism associated with the fixed speed motor, thus ensuring that the motor is properly matched to the shear rate of the unknown fluid. The instrument of the present invention may be adapted for continuous flow-through operation, and the instrument may be developed for automatic operation, with a numerical readout. Still further, the powering may be by means of standard household power or may be by battery for portable operation. In short, many alterations may be made without departing from the teachings of the present invention. It is the intent, therefore, that this invention not be limited by the above, but only as defined in the appended claims.

We claim:

1. A circularly symmetrical viscometer adapted for determining the viscosity of an unknown fluid by comparing the viscosity of said unknown fluid with the viscosity of a known fluid, the viscometer comprising: a first circularly symmetrical chamber for housing a first fluid; a second circularly symmetrical chamber, concentric with said first circularly symmetrical chamber, for housing a second fluid; a circularly symmetrical structure adapted to associate with said first and said second fluids, said structure being provided with a first projection shaped so as to comfortably fit within said first chamber and associate with said first fluid, and further being provided with a second projection shaped so as to comfortably fit within said second chamber in such a manner as to contact said second fluid, displace a certain amount thereof, and consequently float therein, said second projection being coated with a material non-wettable by said second fluid, and the internal wall of said second chamber being coated with a material wettable by said second fluid; means for rotating said first chamber in a first sense; means for rotating said second chamber in a second and opposite sense; and means for determining the relative rotational velocity between the floating structure and said fluid-carrying chambers, thereby providing for the determination of the viscosity of said unknown fluid.

2. The viscometer as defined in claim 1, and further comprising means for adjusting the relative speed of rotation between said first and said second chambers so that said floating structure is precisely stationary; and means for reading the viscosity of said unknown fluid sample when said floating structure is precisely stationary.

3. The viscometer as defined in claim 1, wherein said first fluid has a higher viscosity than said second fluid.

4. The viscometer as described in claim 1, wherein said first circularly symmetrical chamber and said first projection are cylindrical shaped; wherein said second circularly symmetrical chamber and said second projection are ring shaped; and wherein said first and second chambers and said first and second projections are concentric.

5. The viscometer as recited in claim 4, wherein said means for rotating one of said chambers is a variable speed motor; wherein the means for rotating the other of said chambers is a fixed speed motor; and further comprising means associated with said variable speed motor for directly reading the viscosity of said unknown fluid sample.

6. The viscometer as recited in claim 5, and further comprising means for adjusting the drive mechanism associated with said fixed speed motor in order to select the shear rate of the unknown fluid.

7. The viscometer as recited in claim 5, wherein said floating structure comprises two distinct elements and wherein the removal of one of the two elements provides access to said first circularly symmetrical chamber.

8. The viscometer as defined in claim 5, and further comprising means for adjusting the height of the second fluid in said second circularly symmetrical chamber.

9. The viscometer as recited in claim 5, and further including means for shock mounting the elements of said viscometer.

10. The viscometer as recited in claim 5, and further comprising cover means for isolating the floating parts of the viscometer from the external environment.

11. The viscometer as recited in claim 5, and further comprising means for ensuring temperature stability for the temperature-sensitive elements of the viscometer.

12. The viscometer as recited in claim 1, wherein said means for rotating said first chamber operates at a constant velocity; wherein said means for rotating said second chamber operates at a variable velocity; and further comprising means for determining said variable velocity; and means for determining the velocity conditions existing when said floating structure is motionless.

* * * * *